United States Patent [19]

Cornelius

[11] Patent Number: 4,523,690
[45] Date of Patent: Jun. 18, 1985

[54] DOOR OPERATING MECHANISM FOR GRAVITY TYPE FARM WAGON

[75] Inventor: Erwin D. Cornelius, Loda, Ill.

[73] Assignee: M & W Gear Company, Gibson City, Ill.

[21] Appl. No.: 636,818

[22] Filed: Aug. 1, 1984

Related U.S. Application Data

[63] Continuation-in-part of Ser. No. 446,461, Dec. 3, 1982, abandoned.

[51] Int. Cl.³ .............................................. B65D 43/26
[52] U.S. Cl. .................................. 220/262; 220/345; 49/404; 414/414
[58] Field of Search ............... 220/241, 262, 345, 346; 414/414; 298/6, 7; 49/360, 404

[56] References Cited

U.S. PATENT DOCUMENTS

| | | | |
|---|---|---|---|
| 2,652,946 | 3/1950 | Beatty | 220/262 |
| 2,914,000 | 11/1959 | Mulcahy | 220/262 |
| 3,083,057 | 3/1963 | Kiser et al. | 220/345 |
| 3,524,567 | 8/1970 | Coleman | 220/262 |
| 3,819,082 | 6/1974 | Rosenvold | 220/262 |
| 4,267,936 | 5/1981 | Pavlicek | 220/262 |

*Primary Examiner*—George T. Hall
*Attorney, Agent, or Firm*—Allegretti, Newitt, Witcoff & McAndrews, Ltd.

[57] ABSTRACT

The improvement in a gravity box farm wagon of a door opening mechanism for side opening discharge door of the farm wagon includes a hand wheel operated spool with cable wrapped around the spool and connected at its opposite ends to the door and a channel member extending vertically from the door.

6 Claims, 3 Drawing Figures

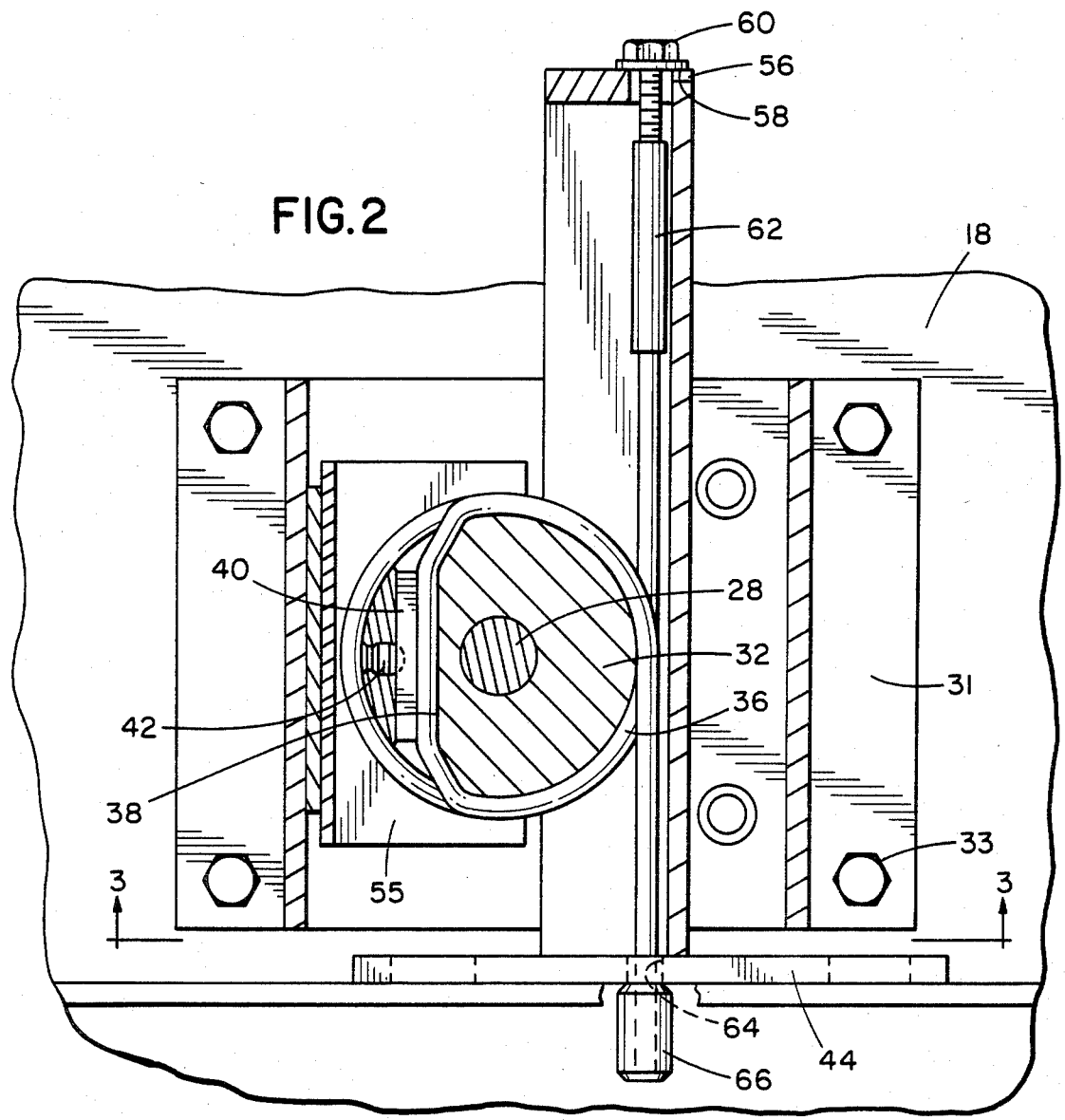
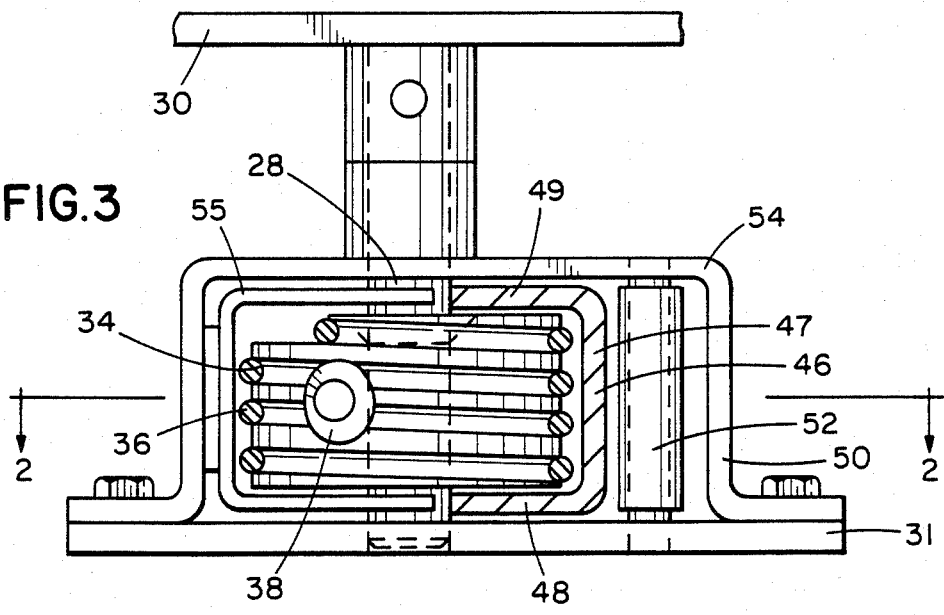

DOOR OPERATING MECHANISM FOR GRAVITY TYPE FARM WAGON

This is a continuation-in-part application of prior application Ser. No. 446,461 filed Dec. 3, 1982, now abandoned.

BACKGROUND OF THE INVENTION

This invention relates to an improved door operating mechanism for a sliding door on the side wall of a gravity box.

Gravity box farm wagons are commonly used for transport of grain. Typically such boxes are rectangular in shape with a sloping bottom or floor. A passage or opening is usually provided on one side of the box so that grain within the box can follow the slope of the floor and flow through the side opening. Typically the box is also mounted on running gear so that it may be transported between the field and a storage facility or grain elevator. Also typically, a sliding door is provided for the grain discharge opening. Generally the door moves vertically along guide rails to open or close the opening.

Heretofore various mechanisms have been used to open and close the door. For example, the door may be attached to a pivoted lever arm to provide for raising or lowering of the door. Another mechanism for raising and lowering the door utilizes a rack and pinion arrangement wherein a rack is attached to the door and a pinion is attached to the side of the gravity box on an axle or shaft. Rotation of the pinion engages the rack and thereby lowers or raises the door.

While the aforesaid mechanisms are useful and efficient, an improved mechanism which is less expensive, easily installed, and may be incorporated with existing gravity boxes is desired.

SUMMARY OF THE INVENTION

Briefly, the present invention comprises the improvement in a gravity box of the type including a side wall with a side discharge opening and a vertically sliding door for the opening of an improved door operating mechanism for raising and lowering the sliding door. The mechanism includes a pivot shaft with a cable wrapped around a spool on the shaft. The cable is connected at one end to the sliding door and at its opposite end to a bracket projecting vertically from the sliding door. The bracket is a channel member which receives and protects the cable. Rotation of the cable spool effects winding and unwinding of the cable to thereby transport the bracket and the door simultaneously in one direction or the other depending upon the sense of rotation of the spool.

Thus, it is an object of the present invention to provide an improved door operating mechanism for a sliding side door associated with a gravity box.

Another object of the present invention is to provide an improved door operating mechanism which is compact and which does not require any gears or complex components.

A further object of the present invention is to provide a door operating mechanism for a vertically sliding door associated with the side opening of a gravity box which is economical to manufacture, easy to install, reliable in operation, and easy to adjust and repair.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 2 is a cross-sectional view of the improved mechanism of the present invention taken along line 2—2 of FIG. 3; and FIG. 3 is a cross-sectional view of FIG. 2 taken substantially along the lines 3—3.

DESCRIPTION OF THE PREFERRED EMBODIMENT

Figure 1:
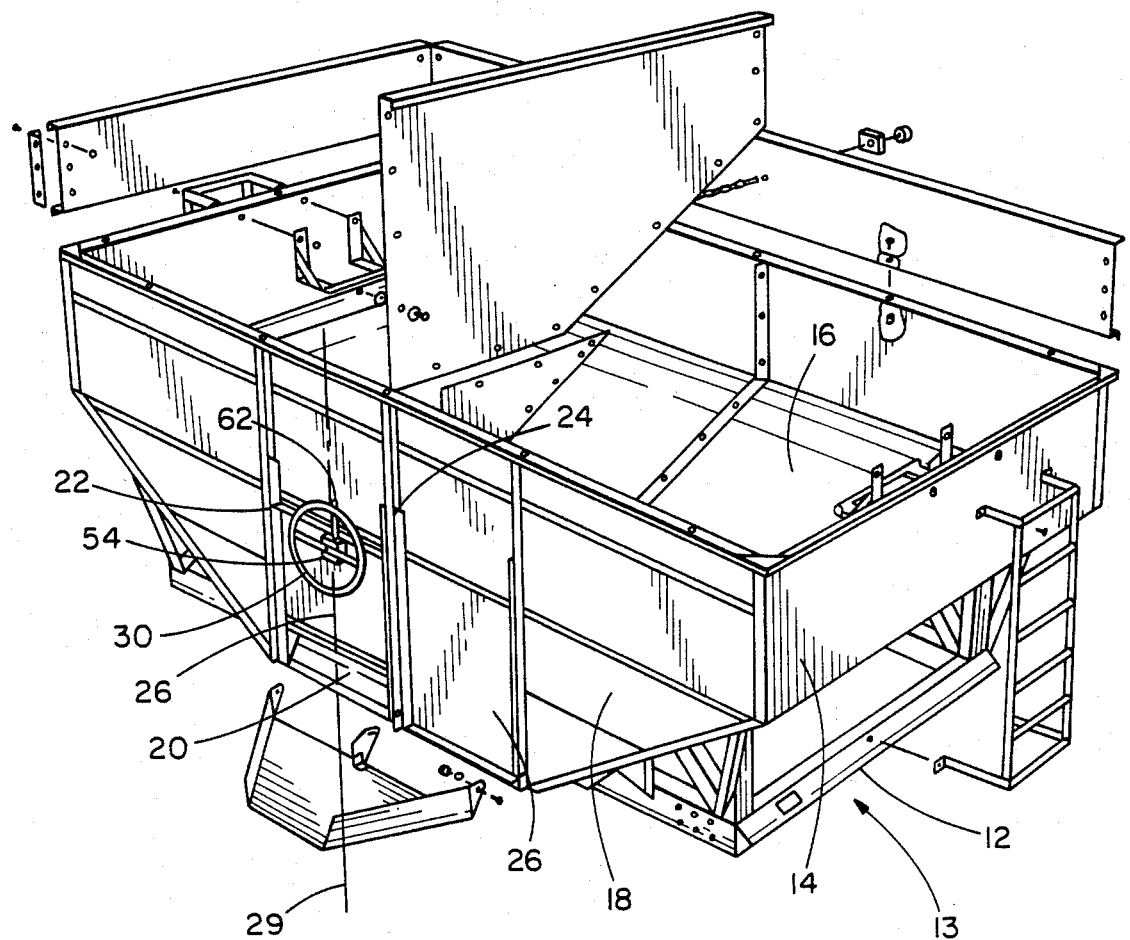
FIG. 1 is an exploded perspective view of a typical gravity box farm wagon incorporating the improvement of the present invention.

Referring first to FIG. 1, there is illustrated a typical gravity box farm wagon which includes the improvement of the present invention. Thus, the gravity box farm wagon includes a running gear (not shown) upon which the gravity box assembly 13 is mounted. The gravity box assembly 13 includes a support frame 12 which supports a gravity box 14. The gravity box 14 includes an inclined bottom or floor 16 which is inclined in the direction of a side wall 18 of the gravity box 14. One or more openings 20 are defined in the gravity box side wall 18. Extending vertically on each side of opening 20 are parallel retention and guide bars 22, 24 attached to wall 18. The guide bars 22, 24 cooperate with the side wall 18 to define a slot into which a sliding door or cover 26 may be positioned and guided. Thus, door 26 may slide vertically to open or close the passage or opening 20. In the prior art, the door 26 was operated by a rack and pinion driven by a wheel.

The present invention depicted in combination with the door 26 in FIG. 1 and in greater detail in FIGS. 2 and 3 relates to an improved mechanism for raising and lowering the door 26. Referring to the figures, the mechanism includes a shaft 28 which is attached to a mounting plate 31. The mounting plate 31 is, in turn, bolted by bolts 33 to the side wall 18 so that the shaft 28 lies substantially along the vertical center line axis 29 of the door 26. Rotatably mounted or journaled on the shaft 28 is a spool 32. Spool 32 is free to rotate with shaft 28 in response to actuation by a hand wheel 30 which is attached to the shaft 28. Thus, rotation of the wheel 30 simultaneously rotates the spool 32 and the shaft 28.

Preferably the spool 32 includes a spiral groove 34 onto which a cable 36 is wound. In the embodiment shown, there are three wraps of the cable 36 about the spool 32 in the groove 34. At the midportion of the spool 32, the cable is directed through a cable hole or passage 38 which defines a chord of the spool. The cable 36 is retained or locked in position in the passage 38 by means of a plate 40 tightened by a screw 42. Thus, a length of cable 36 wrapped around the spool 32 may be wound and unwound on the spool 32 by rotation of the spool. However, the cable 36 will be retained on the spool 32 by virtue of being locked in the cable passage 38.

Extending upwardly from a top horizontal flange 44 of the door 26 is a channel member 46. The channel member 46 includes a crown 47 and side flanges 48, 49. The U-shaped channel member thus encapsulates or fits over the spool 32 as channel member 46 moves relative to spool 32. The channel member 46 rides up and down in a vertical direction in response to vertical movement of the door 26. Channel member 46 is guided in a passage defined by a bracket 50 welded to the plate 31. Preferably idlers or rollers 52 extend between an outside run 54 of bracket 50 to the plate 31 to help guide channel member 46. The bracket 50 also serves to support shaft 28 and thus wheel 30 as well as spool 32. More specifically, bracket 54 and U-shaped channel 55 attached to bracket 54 retains the spool 32, permitting rotation of spool 32 in response to rotational wheel 30.

The channel member 46 has a vertical cross member or cross plate 56 at its top end with an opening 58 therethrough for receipt of a fastening bolt 60. Fastening bolt 60 projects through opening 58 and connects with an adjustable link 62 which, in turn, connects with one end of cable 36. The cable 36 then wraps around the spool 32 in the manner previously described. The opposite end of cable 36 extends through an opening 64 in the horizontal flange 44 of door 26 and is retained in that opening 64 by means of a clamp 66. Thus, cable 36 is retained within the channel member 46 between flanges 48 and 49 and the crown section 47 of the channel 46. A vertical axis 51 is defined generally by the cable 36 which lies on the periphery of the spool 32 so that the cable 36 can tangentially run on and off the spool 32 as the channel 46 moves upward and downward in response to rotational movement of the spool 32. The vertical axis 51 defined by the cable 36 is generally coincident with the path of movement of channel member 46 and axis 29.

In operation then, to open the door 26, the spool 32 is rotated in a counterclockwise direction as depicted in FIG. 2. This causes the cable 36 to wind onto the spool from the direction of the flange 44 and to wind off the spool 32 toward the vertical upward direction and connection to the bolt 60. In this manner a positive driving force is imparted to move the member 46 and attached door 26 upward and open the door 26 merely by rotating the hand wheel 30. To close the door, the hand wheel 30 and thus the spool 32 are rotated in the opposite or clockwise direction. It is important to note the arrangement of the channel 46 is such that the cable connection of the bolt 60 is vertically above the shaft 28 of spool 32 when the door 26 is in the closed position. Also, as previously pointed out, the cable 36 defines a vertical axis within the bracket 46 which is substantially tangent to the spool 32.

While there has been set forth a preferred embodiment of the invention, it is to be understood that the invention is to be limited only by the following claims and their equivalents.

What is claimed is:

1. In a gravity box of the type including a side wall with a side discharge opening, a vertically sliding door mounted for reciprocal movement in channel means on the side wall to open and close the discharge opening, the improvement comprising, in combination:
    a door operating mechanism for positively raising and positively lowering the sliding door, said mechanism including
    a pivot shaft with a cable spool thereon, said shaft defining a pivot axis, said shaft attached to the side wall above the maximum open travel position of the door;
    a vertically projecting door support bracket connected to the door, said bracket having an end extending vertically above the shaft pivot axis when the door is in the closed position;
    a flexible cable connected at one end to the door and having an intermediate section of the cable wrapped around and attached at an intermediate point to the spool and with the opposite end of the cable attached to the bracket end; and
    means for rotating the spool about the axis of the shaft to wind the cable in one direction and unwind the cable in the opposite direction on the spool to thereby positively raise or lower the door.

2. The improvement of claim 1 wherein said bracket comprises a longitudinal bracket member projecting from a top edge of the door, and including a guide on the side wall to guide the bracket member and retain the shaft and spool.

3. The improvement of claim 1 wherein the means for rotating the shaft comprises a manually operable wheel having a diameter greater than the cable spool to provide a mechanical advantage for turning the spool.

4. The improvement of claim 1 including adjustable means for connecting the cable to the spool.

5. The improvement of claim 1 wherein the length of the cable is adjustable.

6. The improvement of claim 1 wherein the bracket comprises a channel member for enclosing the cable.

* * * * *